Patented Oct. 26, 1954

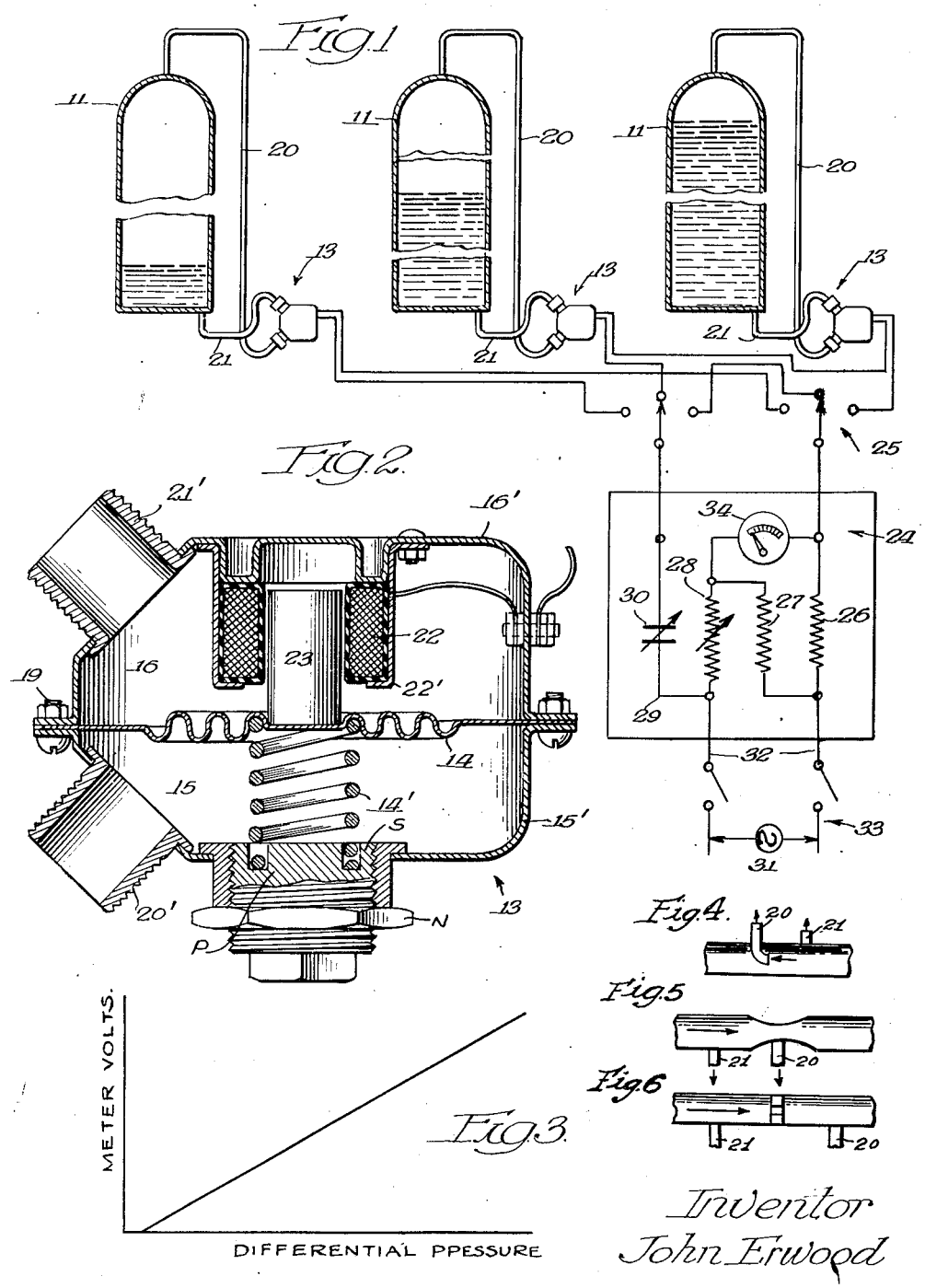

2,692,501

UNITED STATES PATENT OFFICE 2,692,501

PRESSURE MEASURING APPARATUS

John Erwood, Park Ridge, Ill., assignor, by mesne assignments, to The Vapor Recovery Systems Company, a corporation of California Application April 14, 1948, Serial No. 21,041

1 Claim. (Cl. 73—398)

The present invention relates in general to mensuration, and has more particular reference to improved means for measuring fluids in containers, measuring apparatus embodying the present invention being adapted for calibration to indicate, or otherwise measure, the height or level of fluid, or the volume thereof, in a container, or fluid flow in pipes, the present application being a continuation-in-part of application Serial No. 716,315, filed December 14, 1946, now abandoned.

Fluid measurement of the character mentioned may be accomplished by determining differential fluid pressures. Thus, if the temperature and specific gravity of the fluid and the dimensions of the fluid container be known, the volume and level of fluid therein may be determined by measuring the fluid pressure differential at the top and bottom of the fluid column in the container. Likewise, fluid flow through pipes and other fluid flow devices may be determined by measuring the fluid pressure differential on opposite sides of a flow measuring orifice in the flow conduit.

An important object of the present invention is to provide improved pressure operable means for measuring accurately the level of fluid, or the volume thereof, in either open or enclosed tanks or other containers, said means being adapted also to measure fluid flow in pipes and other fluid flow conduits.

Another important object is to provide a fluid measuring device embodying a pressure responsive diaphragm, including means to apply, oppositely on the diaphragm, fluid pressures, the differential of which is to be determined, in order to measure the height of a fluid column, or its volume, or the rate of fluid flow through a measuring orifice, in terms of diaphragm displacement from a zero or datum position; a further object being to measure diaphragm displacement by means of a resonant electrical measuring circuit, including a reactive element variable in accordance with diaphragm movement.

Another important object is to provide improved fluid measuring means of the character mentioned, comprising a fluid pressure unit embodying a diaphragm, a magnetic armature or core drivingly connected with, and movable by, the diaphragm, and an electro-magnetic reactor associated with the core and adapted for inclusion in a resonant electrical bridge circuit for measuring diaphragm movement in terms of electrical variation of the bridge circuit from resonance.

Another important object resides in providing an improved resonant bridge circuit embodying a sensitive voltage meter for use in measuring reactance variations in a fluid pressure responsive reactor; a further object being to provide a measuring circuit adapted for use selectively with any one of a plurality of pressure responsive reactors, whereby the fluid level, or fluid volume, or fluid flow, in any one or all of a plurality of conduits or containers may be determined expeditiously and on a single indicating meter, suitably calibrated for direct reading in level, volume, or flow measuring units.

Another important object resides in employing a loading spring operatively associated with the pressure responsive reactor to obtain a desirable, preferably straight line, linear, or uniformly proportional response, throughout the operating range of the measuring apparatus, whereby the meter may be calibrated with unit indicating calibrations of equal spacement throughout the indicating range of the meter; a further object being to utilize a loading spring to give any desired non-linear response characteristics in the apparatus.

Another important object is to employ, in conjunction with a pressure responsive reactor, a sensitive reactive bridge circuit, operated by alternating current, wherein output voltage varies substantially, in response to changes in reactance, and linearly throughout at least a portion of the response range of the bridge; a further object being to adjust the bridge for operation in the linear or directly proportional portion of its response range, so that the meter may be calibrated with unit indicating calibrations of equal spacement throughout the indicating range of the meter.

The foregoing and numerous other important objects, advantages, and inherent functions of the invention will become apparent as the same is more fully understood from the following description, which, taken in connection with the accompanying drawings, discloses preferred embodiments of the invention.

Referring to the drawings:

Fig. 1 is a diagrammatic sketch illustrating the application of the present invention to the selective measurement of fluid level or volume in any one or all of a plurality of containers;

Fig. 2 is a sectional view through a pressure measuring diaphragm unit shown in Fig. 1;

Fig. 3 is a diagrammatic illustration of a preferred type of response for which apparatus embodying the invention may be adjusted;

Fig. 4 is a diagrammatical illustration showing the manner in which the invention is applied for measuring fluid flow in a Pitot tube;

Fig. 5 is a diagrammatical illustration showing the manner in which the invention is applied for measuring fluid flow in a venturi tube; and Fig. 6 is a diagrammatical illustration showing the manner in which the invention is applied for measuring fluid flow with an orifice.

To illustrate the invention, the drawings show a plurality of containers 11 adapted to contain fluids, and means adapted to measure the volume of fluid in the containers and the height of the fluid levels at any instant. The volume of fluid, as well as the elevation of the fluid level, in a container, may be determined in terms of the weight of the fluid column being measured, the weight of the column, in turn, being a function of the fluid pressure at the bottom of the column, providing the sectional area of the container, the specific gravity of the fluid, its temperature, and the atmospheric or gaseous pressure at the top of the column being measured, are known. Obviously, the sectional area of the column is the same as the sectional area of the container, which can be accurately measured and determined by linear measuring methods. The specific gravity of the fluid in the container may also be determined in any preferred manner, and once determined becomes a known constant in the fluid measuring apparatus. Atmospheric or gaseous pressure on the top of the fluid column being measured may, of course, vary from time to time or at all times; and the apparatus of the present invention provides inherently for the accommodation of changes of atmospheric or gaseous pressure on the top of the fluid column being measured.

The measuring apparatus comprises a diaphragm unit 13 for each of the containers 11, each unit being responsive to the differential of pressure at the top and bottom of the fluid column in its associated container. Each unit 13, as shown more particularly in Fig. 2, may comprise a sealed housing, in which is mounted a sensitive pressure responsive diaphragm 14, which defines a pair of pressure chambers 15 and 16 within the housing on opposite sides of the diaphragm. For convenience, the housing preferably comprises a pair of cooperating shells 15' and 16', which may conveniently be formed of sheet metal, or other preferred material, the shells being suitably secured together and sealed to form the housing and to clamp the edges of the diaphragm therebetween. In this connection, the shells may be provided with cooperating peripheral flanges adapted to be sealed together by suitable fastening means 19, such as bolts, rivets, or welding, to form a hermetic casing and to seal the marginal edges of the diaphragm in the casing, to thereby hermetically isolate the pressure chambers 15 and 16 on opposite sides of the diaphragm.

The housing, also, may be sealingly connected with conduit pipes 20 and 21, respectively communicating with the pressure chambers 15 and 16, as by means of conduit fittings 20' and 21' on the shells 15' and 16'. One of the pipes, as, for example, the pipe 21, may be connected with the associated container 11 at the lower end thereof, whereby to apply the fluid pressure at the lower end of the fluid column in the container to the diaphragm 14 on one side thereof, as in the chamber 16. The other conduit, such as the conduit 20, may be connected to apply the atmospheric or gaseous pressure, prevailing at the top of the fluid column being measured, to the other side of the diaphragm, as in the chamber 15. Where the container 11 is open to atmosphere, the conduit 20 may be omitted, so that the chamber 15 is also connected directly to atmosphere.

Where the container 11 is a closed container, however, the conduit 20 serves to connect the chamber 15 with the upper portions of the container, preferably in position at all times above the fluid level in the container, whereby gaseous pressure in the chamber 15 is at all times identical to the gaseous pressure prevailing within the container at and above the fluid level therein.

The diaphragm 14, accordingly, is adapted to measure the differential of pressure at the top and at the bottom of the fluid column in the connected container 11, such differential representing at all times the mass of the fluid column in the container. As the volume of fluid in the container changes, and the level thereof rises and falls, the diaphragm 14 will be deflected or displaced proportionally from a zero or datum position. If desired, spring means 14' may be applied in the housing 13 to resiliently support the diaphragm against the pressure exerted thereon by the mass of the column.

Whether aided by spring means or not, the deflection of the diaphragm from its zero or datum position will serve to measure at all times the height of the fluid level, and also the mass of the fluid column in the container, such measurement taking account of, and at all times compensating for, any variation in atmospheric or gaseous pressure at the top of the column.

Diaphragm displacement, of course, will be relatively small, and in order to measure it, the present invention contemplates suitable electrical measuring means drivingly connected with the diaphragm and having electrical characteristics adapted to be changed in proportion to small diaphragm movement. To this end, as shown in the illustrated embodiment, the measuring means may comprise a reactor, including a reactance coil 22 disposed within one of the pressure chambers 15, 16, and suitably supported in stationary position on the housing, the diaphragm 14 being drivingly connected with a magnetic core or armature 23, as by fastening the armature directly to the diaphragm, preferably at the center of the diaphragm. The diaphragm 14 and coil 22 also may be mounted in the housing 13, in position such that the armature 23 is supported centrally of, and in magnetic relationship with respect to, the coil 22, whereby displacement of the diaphragm will result in relatively shifting the armature 23 with respect to the coil. Such movement of the armature with respect to the coil will alter the reactive characteristics of the coil as a proportional function of the armature movement. Accordingly, fluid level and volume changes in the tank, resulting in diaphragm displacement, may be measured in terms of the corresponding change in the reactive characteristics of the coil 22.

If desired, the coil may be mounted in the housing on suitable adjustable carrying means, whereby the position of the coil may be adjusted with respect to the armature for zeroizing purposes. Preferably, however, the coil 22 is secured in the casing, as in the chamber 16, as by suitable clamping means 22' anchoring the coil on the housing shell 16', preferably centrally thereof.

In order to determine measurable changes in the characteristics of the device 22, the present invention contemplates the provision of an improved electrical bridge circuit 24, in which the coil 22 is, or may be connected for measuring purposes. Where fluid level and volume in a single tank is to be measured, the device 22 may be permanently connected in the measuring circuit 24. Where several tanks are involved, however, the measuring circuit may be provided with selector switch means 25 for connecting any selected one of a number of tank associated devices 22, in measuring relationship in the circuit 24.

The measuring circuit 24 comprises a bridge circuit having three resistance legs 26, 27, and 28, and a leg 29 which preferably contains a condenser 30 in series in the leg 29 with the reactance coil 22, the selector switch means 25, where necessary, being utilized to connect the coil 22 at will in the leg 29 of the measuring circuit. Electrical energy for operating the measuring circuit may be supplied from any suitable source 31 of alternating current power, through suitable conductors 32 and control switch means 33. The conductors 32 are connected to supply circuit actuating power between the junction of the resistance legs 26 and 27, and the junction of the legs 28 and 29. A suitable alternating current indicating meter 34 may be connected between the junction of the resistance legs 27 and 28 and the junction of the legs 26 and 29, to indicate the reactive characteristics of the reactance coil 22 in terms of the voltage prevailing between the meter connected leg junctions.

In this bridge circuit 24, the legs 26 and 27 have identical electrical resistance. The resistance of the leg 28 is adjustable to balance the resistance value of the coil 22 in the leg 29, and the condenser 30 likewise is adjustable to balance the inductive reactance of the coil 22 with the capacity reactance of the condenser 30, to zeroize the apparatus when the core 23 and coil 22 are in a relative position corresponding with zero or datum pressure conditions at the diaphragm 14. The bridge leg 29 thus constitutes a resonant circuit in which the resonant or null condition is satisfied when $2\pi fL = 1/2\pi fC$, where $f$ equals alternating current frequency of the power source 31 in cycles per second; L equals inductance of the coil 22 in henrys; and C equals capacity of the condenser 30 in farads. Change in impedance of the coil 22, through relative displacement of the core 23, as a result of change in pressure differential on the diaphragm 14, will be indicated on the meter 34 in proportion to the variation of coil impedance from that required to satisfy the resonant condition. By employing a variable inductor 22, 23, the impedance variation of which is a linear or directly proportional function of core displacement, the meter may be made to indicate differential pressures linearly on a scale having equally spaced unit graduations, as indicated by the typical response curve shown in Fig. 3. This may be accomplished by designing the diaphragm and the spring, if used, to provide uniform displacement of the member 23 per unit of pressure differential throughout the pressure measuring range of the apparatus.

The variable inductor may comprise a coil having substantial length as compared with its diameter, the core being mounted on the diaphragm may be made to move from a position of maximum inductance at zero pressure to some point in the axial length of the coil representing the maximum pressure range of the instrument.

The spring 14' may conveniently comprise a helical element mounted at one end, preferably adjustably on the casing 13, in position to bear the other end of the spring on the diaphragm 14, as at a suitable spring seat, formed preferably centrally in the diaphragm. As shown, the spring extends within the chamber 15 and is mounted in a support seat S, formed in a mounting plug P which is threadedly adjustable in a plug opening, formed centrally in the housing shell 15'. A lock nut N on the plug may be employed to clamp the plug in adjusted position in the plug opening. It will be seen from the foregoing that the spring mounting plug may be readily adjusted to apply any desired spring thrust on the diaphragm in order to bias the same for zeroizing purposes. Furthermore, it can be seen that, by employing a diaphragm of exceedingly flexible material, the displacement thereof, and of the core 23, will be determined by the spring. It is thus practical to change the operating range of the device by changing the spring used. In general, the deflection of a plan helical spring is determined (up to the elastic limit of the spring material) by the applied force, the deflection maintains a linear relationship to the applied force. In some applications, such as measuring flow through orifice plates, venturi or other similar devices, it is desirable to utilize a spring whose deflection is proportonal to the square root of the applied force, in order to satisfy the equation $V=\sqrt{2gh}$ for measuring flow through pipes, and the like.

A spring whose deflection will follow a square root law may be, for example, (a) a spring with a modified conical cross-section, or (b) a helical spring having a constant diameter and the pitch angle of which varies throughout the length of the spring.

The meter 34, if desired, may be calibrated to indicate either the fluid level or the volume of fluid in the container, or both, by providing the meter with both level and volume scales. Such calibration scales may take into account variations in the sectional area of the column being measured throughout the height of the column, although ordinarily the tank and the fluid column therein will have uniform sectional area throughout. The meter may be calibrated for a specific fluid, since ordinarily a storage tank will always contain the same kind of fluid. Where, however, a single meter and measuring system is used selectively with a number of different storage tanks containing different fluids, the meter may be calibrated to a selected standard fluid and correction tables, based on the specific gravity of other fluids, may be utilized to enable measurement of fluids having such other specific gravities. In order to operate the measuring system, the spring 14 may be adjusted and the circuit 24 may be balanced from zero or datum pressure of the fluid column, zero pressure being the condition where pressure in the chambers 15 and 16 is in effect equal. Thereafter, any change in position of the diaphragm, and the consequent change in permeability of the magnetic circuit of the reactor, will cause an unbalanced reactive condition in the measuring circuit 24, causing the meter 34 to measure the degree of unbalance which corresponds with the change in magnetic permeability of the reactor, such change, in turn, being proportional to the displacement of the diaphragm 14 under the influence of the weight or mass of the fluid column in the tank.

The indicating device or meter may be calibrated in head pressure, or in gallons, or in inches, as desired. One important advantage of the present invention is that the indicating device may be located at any desired distance from the container in which the fluid being measured is located.

The arrangement described may also be used for the measurement of fluid flow through an orifice, venturi, or Pitot tube, merely by connecting the tubes 20 and 21 to measure fluid flow induced pressure differentials in the venturi, Pitot tube, or orifice, as illustrated in Figs. 4, 5 and 6, the diaphragm 14 in such an arrangement being responsive to the flow measuring pressure differentials in substantially the same fashion as described herein. The meter 34, for flow measuring purposes, of course may be suitably calibrated to indicate fluid flow directly, as, for example, in gallons per minute, or in other desired flow measuring units.

By connecting an electrical integrator, preferably preceded by an amplifier, in place of the meter 34, or in parallel relation therewith, fluid flow during any desired time interval may be measured and recorded, if desired.

The apparatus herein disclosed is highly sensitive by virtue of the employment of balanced inductive and capacity reactance in the variable leg 29 of the bridge circuit, for the reason that a relatively large ratio of impedance variation is obtained by taking advantage of resonance in the variable leg of the circuit. For example, a variable inductor, whose impedance changes from, say, 527 to 721 ohms, a variation of 56%, when adjusted through the operating range of the apparatus, when associated in circuit with a condenser, adjustable to obtain resonance, will provide an effective impedance of the inductive and capacity reactance, in circuit, changing from, say, 320 ohms to 1660 ohms, a variation of about 520%. The arrangement, through the resonant character of the circuit, provides for a very definite null balance at zero, thus reducing error to a minimum, and facilitating the setting of the apparatus to zero or datum position, and provides relatively large proportionate impedance change in response to operation of the apparatus between datum position and the limit position of maximum pressure measurement.

An important feature of the invention resides in the use of a pressure responsive variable inductor in a resonant circuit adapted to be balanced in a zero or datum position and to measure pressures in terms of unbalance of the resonant bridge circuit; a further feature being the utilization of means, such as the spring 14', or inherent construction of the diaphragm 14, to provide a desired response of the variable inductance through the measuring range of the equipment, whereby the meter 34 may be calibrated to indicate on a uniformly graduated scale.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

Means for measuring fluid flow, in flow means such as a venturi, Pitot tube, or orifice, comprising means forming an hermetic housing providing a chamber, pressure responsive means comprising a flexible diaphragm in said chamber, resilient biasing spring means in said chamber and normally urging said diaphragm yieldingly in one direction toward a datum position, said spring having a deflection characteristic in response to applied pressure in accordance with the formula $V=\sqrt{2gh}$, means to apply flow induced pressures, prevailing at remote stations in the flow means, in said chamber, respectively on opposite sides of said diaphragm, to move the same from a datum position against said spring in response to the differential of said pressures, an inductive reactor comprising a coil disposed in said chamber adjacent said diaphragm and a core drivingly connected with said diaphragm and movable thereby relative to the coil for altering the permeability of the coil, to thus change its reactive charactistics in accordance with movement of said diaphragm from its datum position, and electrical measuring means comprising a bridge circuit adapted for connection with said reactor and including capacity reactance adjustable to bring the circuit to resonance when said reactor is in said datum position, and metering means, responsive to unbalanced conditions in said circuit resulting from variation of the impedance of said inductive reactor when displaced from said datum position, for measuring said variation and the corresponding pressure differential in terms of the degree of unbalance of said circuit.

References Cited in the file of this patent

UNITED STATES PATENTS

| Number | Name | Date |
|---|---|---|
| 1,939,067 | Legg | Dec. 12, 1933 |
| 2,213,485 | Conley | Sept. 3, 1940 |
| 2,361,738 | Bird | Oct. 31, 1944 |
| 2,376,156 | Kuehni | May 15, 1945 |
| 2,402,666 | Raspet | June 25, 1946 |
| 2,407,141 | Coake | Sept. 3, 1946 |
| 2,452,156 | Schover | Oct. 26, 1948 |
| 2,557,393 | Rifenbergh | June 19, 1951 |

FOREIGN PATENTS

| Number | Country | Date |
|---|---|---|
| 683,976 | Germany | Nov. 20, 1939 |
| 559,149 | Great Britain | Feb. 7, 1944 |

OTHER REFERENCES

Seeley, "A Brief Summary of Bridge Networks," article in "Electrical Engineering," March, 1940. Page 110 relied on of pages 108–111.

Moore, Jr. (article), Instruments: vol. 16 #5 (pages 250, 251, 252, 280).